Jan. 16, 1934. R. C. HEMPSTEAD ET AL 1,943,434
APPARATUS FOR MOLDING CAST WHEELS
Filed Jan. 29, 1931  4 Sheets-Sheet 2
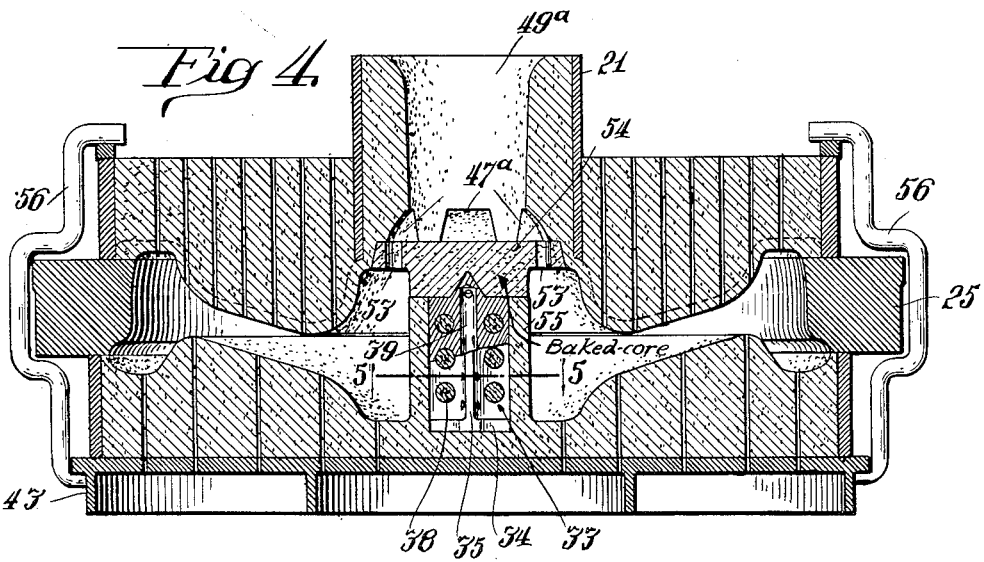
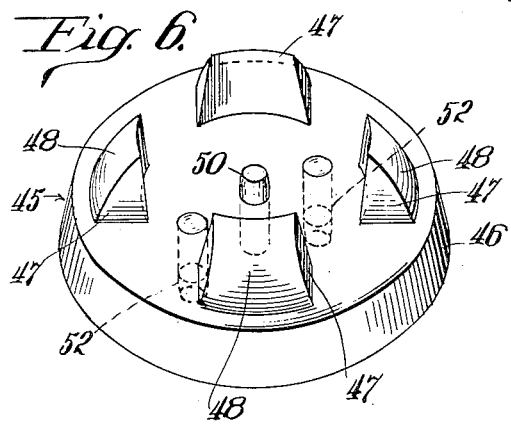
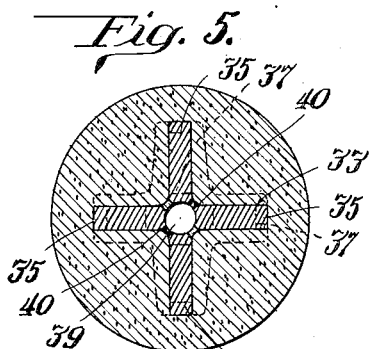
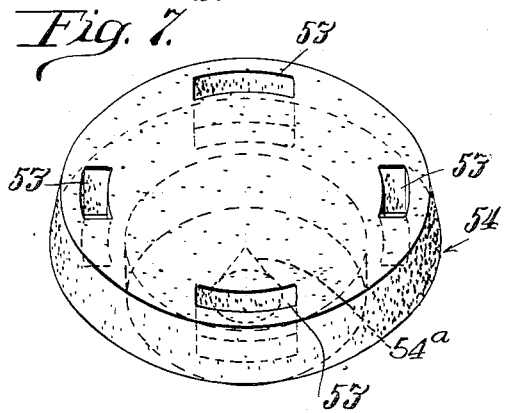
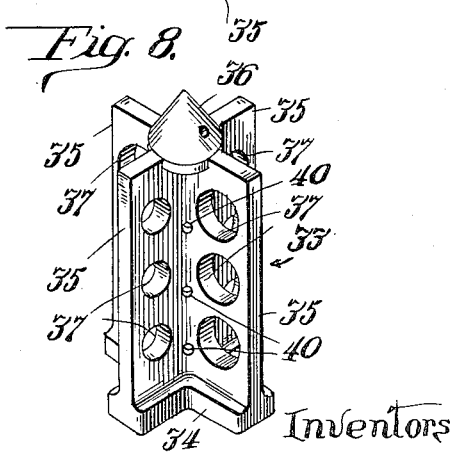
Inventors
Ralph C. Hempstead
Joseph H. Marshall,
By George Heideman
Attorney.
Witnesses
Milton Lenoir

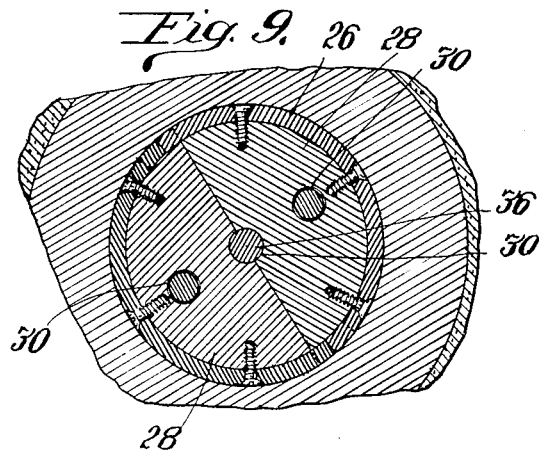
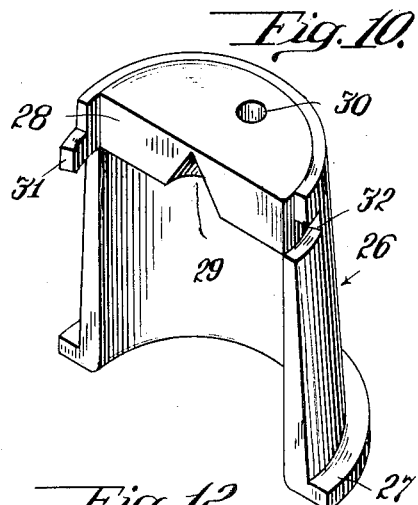
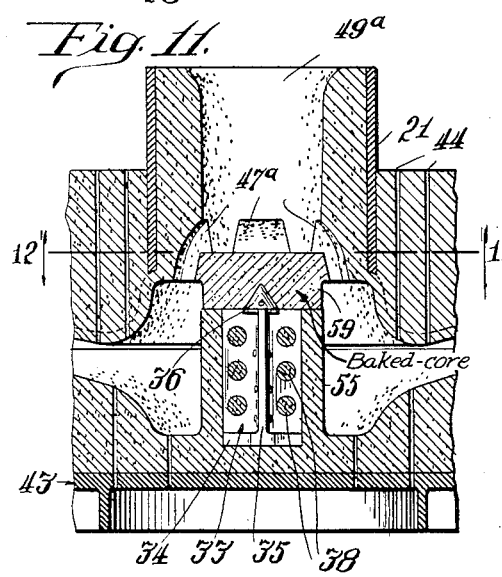
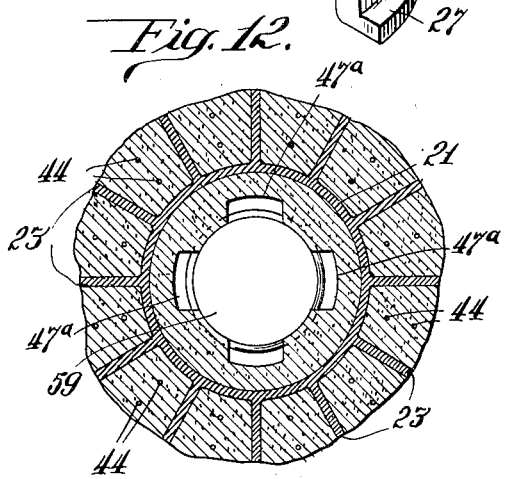
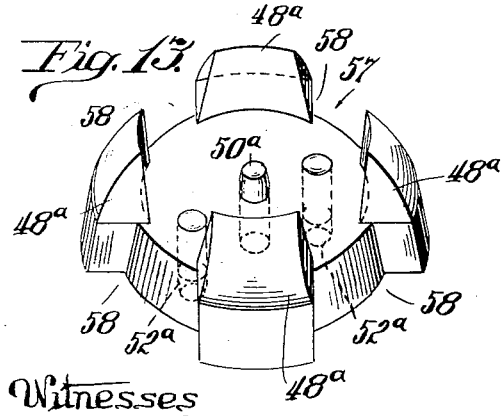
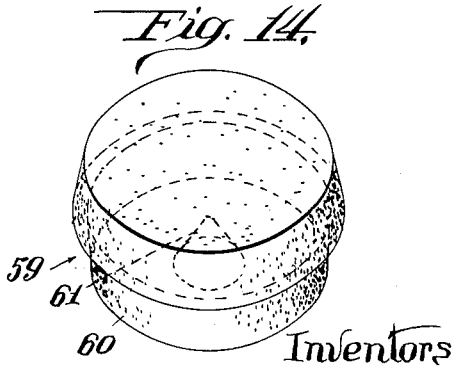

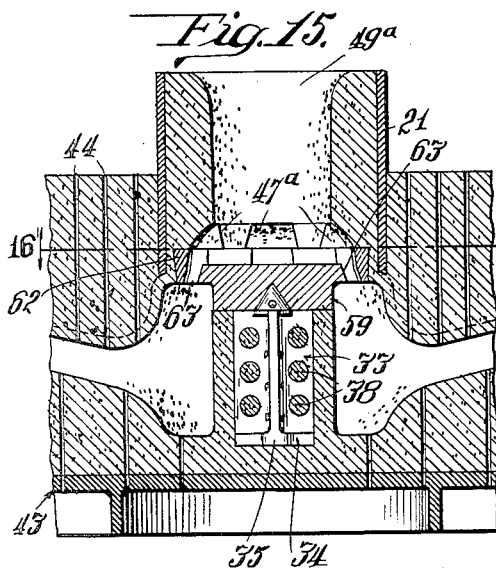
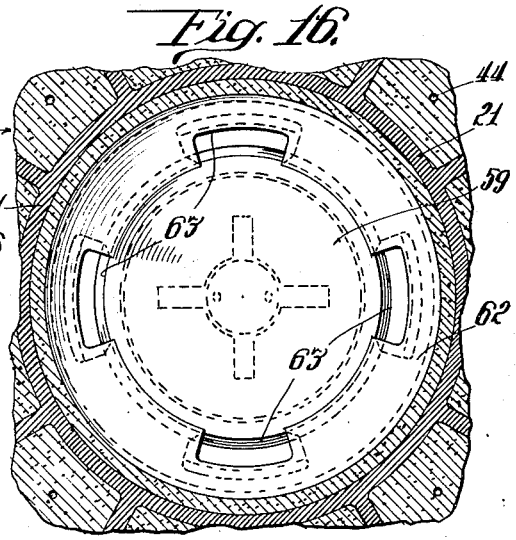
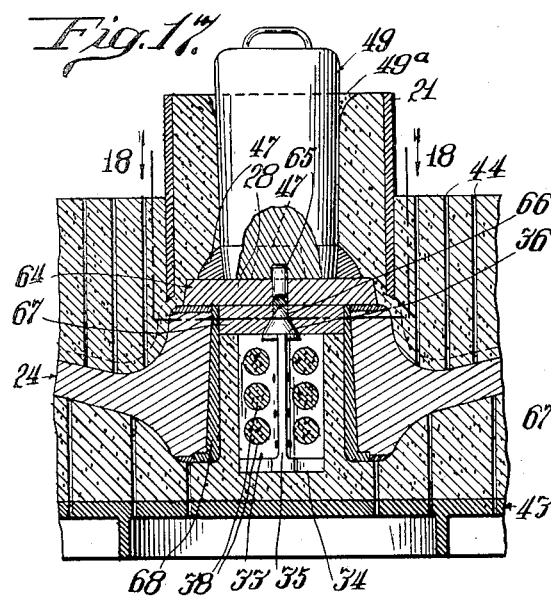
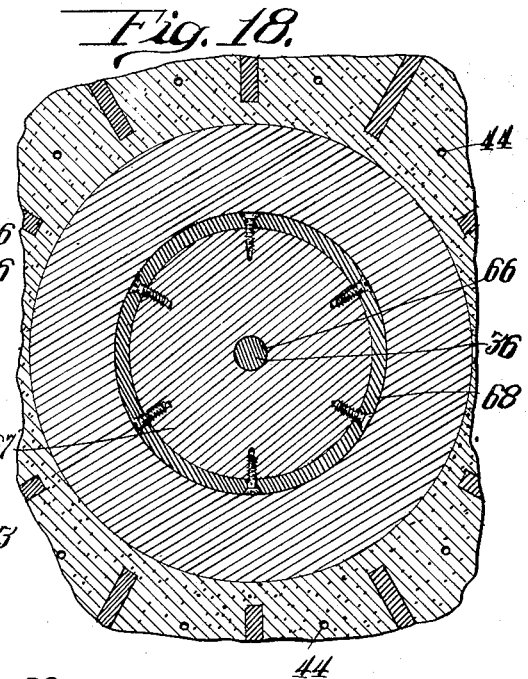
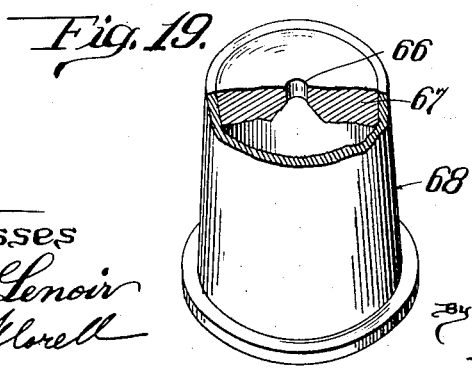

Patented Jan. 16, 1934

1,943,434

UNITED STATES PATENT OFFICE 1,943,434

APPARATUS FOR MOLDING CAST WHEELS

Ralph C. Hempstead and Joseph W. Marshall, Milwaukee, Wis.

Application January 29, 1931. Serial No. 512,016

6 Claims. (Cl. 22—131)

Our invention relates to means for molding cast wheels whereby the use of baked or dry center sand cores as heretofore employed is eliminated; the usual knocking out of the core obviated and the cast wheel permitted to be more quickly placed in the annealing pit, with the result that a stronger wheel is provided and a finished wheel having a true and clean center for machining produced with less loss from gas pockets.

Our invention has for its object the provision of means whereby a true center for the wheel is provided; the usual poking of cores before pitting the wheels is obviated; and whereby hub checks and hub cracks are eliminated.

Our invention also has for its object the provision of means which eliminate the necessity of making center cores; whereby the use of core oil, core sand and core binders is also eliminated, and porosity in the cast wheel is practically eliminated.

With the use of our improved means and method of casting wheels, less time is required between the time the wheel is exposed by the molder and the time of placing the wheel in the pit and therefore a great saving in labor is obtained; while also producing a wheel which can be more easily and better machined than has heretofore been the case.

Our improved method and the new means employed, as well as the advantages resulting from the use, will all be comprehended from the detailed description of the accompanying drawings, wherein—

Figure 4 is a view similar to Figure 2, with the wheel pattern, sleeve and head block removed and the two sections of the mold provided with an overall clamp, illustrating the mold ready for the pouring operation.

Figure 5 is a detail sectional view taken substantially on the line 5—5 of Figure 4 as viewed by the arrows.

Figure 6 is a perspective view of the top print employed as shown in the assembly in Figure 2.

Figure 7 is a perspective view of the baked dish core shown in the assembly in Figure 4 and which takes the place of the top print shown in Figures 2 and 6.

Figure 8 is a perspective view of our improved centering core anchor.

Figure 9 is a sectional view taken substantially on the line 9—9 of Figure 2 as viewed by the arrows.

Figure 10 is a perspective view of one half of our improved split sleeve employed in the assembly views Figures 1 and 2.

Figure 11 is a vertical sectional view of the central portion of an assembly showing a modification.

Figure 12 is a transverse sectional view taken on the line 12—12 of Figure 11, as viewed by the arrows.

Figure 13 is a perspective view of the modified form of top print employed in Figure 11.

Figure 14 is a perspective view of a modified sand core employed in the form shown in Figure 11.

Figure 15 is a vertical sectional view of a portion of mold, similar to Figure 11, with a baked ring shown rammed in place and illustrating a type especially intended for casting larger sized wheels.

Figure 16 is a cross sectional view taken substantially on the line 16—16 of Figure 15 as viewed by the arrows.

Figure 17 is a vertical sectional view of a mold portion, illustrating a further modification.

Figure 18 is a sectional view taken substantially on the line 18—18 of Figure 17, as viewed by the arrows.

Figure 19 is a perspective view of the type of sleeve employed in the modification illustrated in Figure 17.

Our improved means and method relate to the molding of cast wheels wherein the use of green molding sand may be employed in place of the usual baked or dry center cores and a stronger wheel produced with a true and clean center for machining; our invention at the same time enabling the cast wheel to be more quickly placed in the annealing pit.

Figure 1:
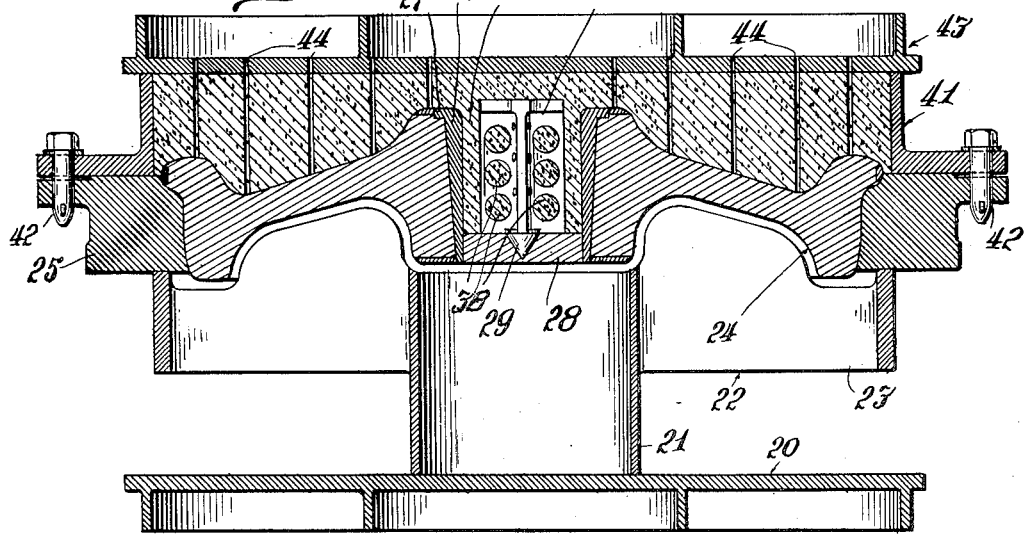
Figure 1 is a sectional elevation of the assembled elements of a mold, as arranged in the first operation.
Figure 2:
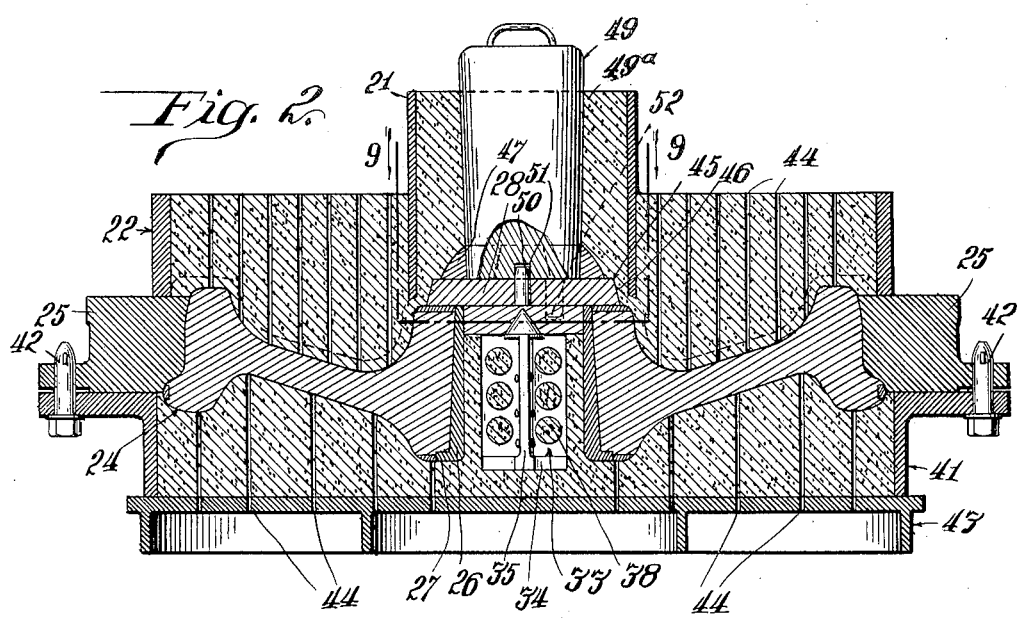
Figure 2 is a similar view showing the mold inverted, with top print and head block inserted and the top base board removed, illustrating the second operation.

The method as exemplified in Figures 1, 2 and 4 is carried out in the following manner.

The base board 20 is provided with a suitable holder 21 on which the cope 22 is centrally mounted; the cope 22 being provided with suitable wings as shown at 23 having contour substantially that of the pattern 24 and of the wheel to be cast.

The pattern 24 having been centrally seated on the cope 22, the chill ring 25 is then placed about the pattern on the outer perimeter of the cope 22, as shown in Figure 1.

The hub portion or bore of the pattern 24 is then provided with the split sleeve 26. The sleeve 26 in this particular exemplification consists of the complementary portions or half sections as shown in Figure 10.

Each complementary portion or half section has tapering outer side walls as shown, with the enlarged end provided with the outwardly disposed flange 27, while the tapered end is closed by the semi-circular block 28 having a segment of a conical socket 29 and provided with a dowel-pin receiving hole 30. One longitudinal side or edge of each sleeve section 26 is provided with a circumferentially disposed tongue or lug 31, while the other longitudinal side is provided with a matching tongue receiving socket 32, whereby the two sleeve sections are held in proper relation with each other when the sleeve is inserted into the bore of the pattern with its closed end downward, as shown in Figure 1. The split sleeve 26 and its segmental end blocks 28 consists of suitable metal, preferably aluminum.

The split sleeve 26 is then provided with the metallic centering core anchor 33 shown in detail in Figure 8.

This anchor member 33 is preferably cast iron provided with a base 34 of a cross formation and having wings 35 disposed at right angles to each other and united at their intersecting edges, and the upper ends of the wings, as viewed in Figure 8, at the longitudinal axis of the anchor member provided with the integral cone-shaped tip 36. This cone tip 36 is adapted to fit into the cone-shaped socket 29 formed by the two segmental blocks 28 of the sleeve 26, as shown in Figure 1.

The wings 35 of the anchor member 33 are each provided with a plurality of comparatively large sand knitting holes 37 for the reception of green sand as shown in Figures 1, 2 and 4 at 38.

The member 33 is provided centrally with a longitudinal bore or passage 39, see Figure 5, with which the small gas openings 40 in the main body and in the cone tip of the member 33 communicate to permit escape of the gases.

The annular member or drag 41 is placed on the chill ring 25, and locked in place in any suitable manner as by the keys or pins 42.

The drag 41, split sleeve 26 and the holes 37 of the centering anchor member 33 are then filled with sand, and the sand firmly rammed about the pattern and the anchor member, as shown in Figure 1, and a suitable base board 43 placed thereon; the rammed or tamped sand being provided with the gas holes or passages as at 44, made and arranged in the usual manner.

The assembled parts thus far described are then inverted as shown in Figure 2.

Our improved top print 45 is then put into place as shown in Figure 2. The top print 45, which is preferably of suitable wood, is in the nature of an annular plate having a beveled perimeter as shown at 46, with the top surface provided with preferably a plurality of upstanding lug portions 47 arranged at diametrically opposite points and equi-distances apart, as more clearly shown in Figure 6.

Figure 3:
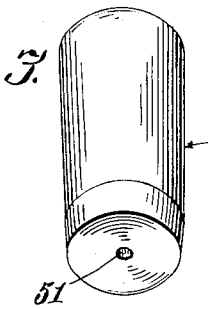
Figure 3 is a perspective view of the sprue or head block shown in Figure 2.

These lugs 47 are each made on their outer faces with surfaces 48 curving inwardly toward the inner faces which latter are transversely curved to fit about the head block or sprue 49, see Figures 2 and 3. The top print 45 is provided with a center pin 50. The upper end of pin 50 is preferably shown slightly tapered to fit into a suitable hole 51 in the bottom of the sprue or head block 49. The bottom of the print 45 is also shown provided with a pair of pins 52, 52 which are adapted to enter the holes or sockets 30 in the sectional block 28 arranged in the end of the split sleeve 26, see Figure 2.

The top of the mold, namely the cope 22 and the holder or cope-head 21 are then rammed with green sand and the sand in the cope proper provided with the usual gas passages as shown at 44.

The head block 49 is then withdrawn and the cope 22 with the head 21 are then lifted off the chill ring 25 so as to permit removal of the pattern 24, the split sleeve 26, and the top print 45.

The latter is easily removed because of its beveled side and the inwardly curving lugs 47.

It is apparent that the lugs 47 of the top print will form downwardly and outwardly curving gates or passages 47$^a$ in the green sand which are adapted to register with the passages or gates 53 formed in the baked dish core 54 shown in Figure 7, which takes the place of the top print 45; the bottom of core 54 being centrally provided with a cone-shaped socket shown in dotted lines at 54$^a$ in Figure 7.

The gates or slots 53 are somewhat arcuate as shown in Figure 7 and provide free passage for the molten metal; while the perimeter of the core 54 is beveled like the top print to fit the green sand core as formed by the top print 45.

The lower side of the dish core 54 is provided with the annular shoulder or hub portion as more clearly shown in Figure 4, to rest on the green sand core 55 formed by the split sleeve 26 and the centering anchor 33.

The cope or top section of the mold, after the usual proper treatment and smoothing and greasing of the chill ring 25, is then properly positioned on the lower section, as shown in Figure 4, and the two sections firmly clamped to the iron base-board 43 by the overall clamps 56.

The mold is now in condition for pouring, through the pouring hole 49$^a$ made by the head-block 49.

It is apparent that the molten metal will fall on the baked dish core 54 and thus properly protect the green sand against the splashing action encountered during pouring; the less turbulent molten metal then readily flowing through the comparatively large, hollowed-out passages 47$^a$ in the green sand and the gates 53 in the baked dish core 54.

In Figures 11 to 14, we show a modification in so far as the top print and baked core are concerned; Figure 11 being a central sectional view of the assembled sections ready for pouring, as in Figure 4.

Instead of the top print 45 shown in Figure 6, the top print 57 shown in Figure 13 is provided with cut away sectoral portions at 58 intermediate of the upstanding lug portions 48$^a$ which latter are similar to the lug portions 48 of the top print 45. The top print 57, like top print 45, is also provided with a beveled perimeter and with the upstanding pin 50$^a$ and the downwardly disposed pins 52$^a$; the pin 50$^a$ being intended to properly center the head block 49, while the pins 52$^a$, 52$^a$ (intended to enter the holes 30 in the block 28 of the sleeve 26), properly center the top print 57 on the core forming sleeve member.

When the top print 57 is employed, the green sand is also rammed in the sectoral cut-away portions 58; while the upstanding lugs will form similar openings or passageways 47ᵃ as shown in Figure 4 for the molten metal.

After the top section of the mold has been formed as previously described, the head block 49 is removed and the top section lifted from the bottom section, permitting the top print 57, the pattern 24 and the split sleeve 26 to be removed.

Instead of the baked core 54 of Figure 7, we employ the baked core 59 shown in Figure 14, namely a core substantially equivalent to the central portion of core 54, located within the plane of the openings 53.

That is to say, baked core 59 is equivalent to the central portion of the print 57 located within the circumferential plane of the lugs 48ᵃ.

The core 59 is also preferably provided with a beveled perimeter, as shown, with the bottom provided with the central hub portion 60.

The bottom of the baked core 59, and the bottom of baked core 54, are each provided centrally with a cone-shaped socket 61 and 54ᵃ, respectively, which receives the cone-shaped tip 36 of the centering anchor 33.

The baked core 59 is placed on the anchor member 33, like in the previous method and the top section of the mold then put into place on the chill ring 25 and the sections clamped together by the overall clamps 56. The mold is then in condition for pouring.

It is apparent that with our improved method of cast wheel molding, the use of the elaborate baked cores as heretofore employed is eliminated and green sand and smaller and less elaborate baked cores used; namely small baked cores which can be more quickly made then those heretofore used. At the same time our improved centering anchor member not only permits proper gas escape, but also ensures a proper positioning and holding of the smaller baked core in place and enables the making and use of a green sand core.

The split sleeve 26 is shown tapered on the outside, permitting its easy removal from the pattern, while the inside is straight as shown and provides the diameter of the wheel-center before the latter is bored.

In Figures 15 and 16, we disclose another modification wherein the top section of the mold involves a baked ring 62 provided with a suitable number of gates or passages 63 formed at the inner periphery of the ring 62, as shown in Figure 16. This ring 62 is preferably provided with a slightly tapered outer periphery as shown in Figure 15, while the gates 63 are made in an outwardly sloping manner as shown so as to direct the molten metal into the pattern cavity. This ring 62 is intended for use with a baked sand core similar to the core 59 shown in Figure 14; while the remainder of the mold is formed and involves the elements as heretofore described. The type shown in Figures 15 and 16 is especially intended for molding wheels of a larger size; the ring 62 being, of course, embedded in the green sand which is rammed in the holder 21 while the head-block 49 is in place; the passages 47ᵃ being afterward formed in the packed green sand, so as to register with the gates 63 in the baked ring 62. It will be understood that the mold as shown in Figure 15 is ready for pouring.

In Figure 17 we illustrate a further modification; the mold being shown in preparation before receiving the baked dish core. That is to say, the mold is shown with a top print 64 which is substantially similar to top print 45, except that print 64 is merely provided with a center pin 65 extending beyond the top and bottom of the print so the upper end may extend into the central hole in the bottom of the sprue or head-block 49, like in Figure 2 and thereby center the block; while the lower end of the pin extends into a central hole 66 in the end block 67 of a single piece sleeve 68 shown in Figure 19.

The form shown in Figure 17 may be used for casting any style of wheel and with the exception of the pin 65 of top print 64 and the sleeve 68 is in every other respect similar to the type illustrated in Figure 2.

The lower end of the pin 65 is provided with a conical socket to receive the cone tip 36 of the center anchor member 33.

The sleeve 68 in this form is made continuous, namely of a single piece and therefore is given a slight internal as well as an external taper. That is to say, in addition to being tapered externally toward the upper end, the sleeve 68 is also provided with a slight taper toward the upper end block receiving end on the interior so as to enable the sleeve to be readily removed after the green sand has been properly tamped within the sleeve and through and about the center anchor member 33 and the top section of the mold, the top print 64 and the pattern 24 have been removed.

With our improved means and method, the small baked core and the anchor member may be quickly removed which therefore obviates the need of knocking out the core as has heretofore been necessary, which practice often results in breaking the baked cores heretofore used which required considerable time and labor in their making.

As a result of our invention, the wheel cast by our method can be more quickly placed in the annealing pit and consequently stronger wheels are produced.

We have chosen to illustrate the top prints adapted to provide four passages in the green sand and likewise baked cores provided with matching passages or gates, but it will be understood that any suitable number of gates may be made to permit proper flow of the molten metal; and while we have described what are believed to be simple exemplifications of the invention, which have been described in terms employed merely as terms of description and not as terms of limitation, modifications are possible and may be made without, however, departing from the spirit of our invention.

What we claim is:

1. In car wheel casting apparatus provided with a wheel-forming annular chamber, wheel-hub forming means comprising a vertically disposed centering anchor member arranged centrally in the bottom of said chamber and having a vertically disposed body terminating at top in a centering tip and provided with a central bore and gas passages in the body sides communicating with the bore, said member having radially disposed wing portions adapted to receive green sand therebetween to provide a hub core, and a baked core adapted to rest on the sand core and provided on its bottom with a socket adapted to receive the centering tip of the anchor member and held thereby, the baked core at its perimeter being formed to provide an outwardly and downwardly sloping pouring passage disposed in a circumferential plane beyond the wheel hub green sand core and said anchor member.

2. In apparatus for casting car wheels of the character described wheel-hub bore forming means consisting of a vertically disposed centering anchor member for the hub core of the wheel provided with a conical central tip, a bore extending longitudinally through the central body portion, gas ports in the sides of the body portion communicating with said bore, said anchor member having radially disposed wings provided with green sand anchoring surfaces.

3. In a wheel casting apparatus, the combination of sand receiving top and bottom members with a chill ring therebetween; a vertically disposed centering anchor member arranged centrally in the bottom member and having a central upstanding tip, sand receiving cavities and sand knitting surfaces in the sides, a central bore and gas venting passages communicating with the bore; a sand core formed about the anchor member; and a baked core adapted to fit onto said anchor member and provided with a central portion of diameter greater than the diameter of the anchor member so as to cause the molten metal to flow beyond the sides of the anchor member and the upper end of the sand core, the lower face of the baked core being provided with a socket adapted to receive the tip of said anchor member.

4. In apparatus of the character described for casting car wheels, involving molded sand holding members arranged one on top of the other with the sand molded to provide a wheel forming chamber, the top member having a molten metal receiving opening in the top, wheel-hub bore forming means comprising a vertically disposed anchor member provided at the upper end of its longitudinal center with an upwardly disposed centering tip and with portions disposed laterally on opposite sides of its longitudinal axis, said portions having sand receiving passages, while the body portion and the tip are provided with gas vents; a green sand core formed about the anchor member between said portions and in said passages; and a baked core arranged on top of the anchor member and surrounding green sand core and having a solid center body portion adapted to cover the upper end of said green sand core and anchor member, the lower face of said baked core having a socket adapted to receive the centering tip of the anchor member, said baked core having an annular top portion of greater diameter than the bottom portion, the perimeter of the top portion being beveled outwardly toward the bottom so as to cause the molten metal to enter the cavity in a vertical plane beyond the sides of said green sand core.

5. In apparatus for casting car wheels of the character described involving molded green sand holding top and bottom members, a chill ring disposed between said members and all secured together to form an annular wheel forming chamber, a cylindrical green sand containing holder arranged centrally in the top member to provide a molten metal pouring passage, hub core means disposed beneath said holder and comprising a centering anchor member of skeleton form arranged centrally in the bottom member and disposed vertically and having sand receiving cavities in its sides and provided at top with a centering tip, a green sand core formed cylindrically about the anchor member to form a wheel-hub core, and a baked annular core in the bottom of the holder and disposed on the anchor member and said green sand core, the baked core having a socket adapted to receive the centering tip of the anchor member, said core being adapted to deflect the incoming molten metal toward the sides of the hub core means.

6. In car wheel casting apparatus of the character described the combination of top and bottom members provided with green sand molded to form an annular wheel forming chamber with a pouring opening in the center of the top member, with a wheel-hub core arranged centrally in the chamber in the bottom member and comprising a center anchor member having green sand receiving cavities in its side and an upstanding center tip; and an annular baked core adapted to rest on and cover the upper end of said anchor member and formed to receive the tip of the anchor member, said baked core adjacent its outer perimeter having circumferentially arranged gates disposed in a plane beyond the sides of the anchor-member.

RALPH C. HEMPSTEAD.
JOSEPH W. MARSHALL.